3,370,025
ETHANOLIC LACQUERS BASED ON
CELLULOSE BUTYRATE
Martin Salo and Loring W. Blanchard, Jr., Rochester,
N.Y., assignors to Eastman Kodak Company, Rochester, N.Y., a corporation of New Jersey
No Drawing. Continuation-in-part of application Ser. No. 237,305, Nov. 13, 1962. This application Mar. 24, 1967, Ser. No. 625,612
6 Claims. (Cl. 260—15)

ABSTRACT OF THE DISCLOSURE

Cellulose butyrates having excellent solubility in ethyl alcohol have been discovered. These cellulose butyrates must have certain butyryl and hydroxyl contents in order to achieve the necessary solubility in ethyl alcohol. Lacquers containing ethyl alcohol as the major solvent can then be made using these specially soluble butyrates.

This invention relates to lacquers, and more particularly to lacquers containing butyric esters of cellulose as film former and ethyl alcohol as the principal solvent. This application is a continuation-in-part of U.S. Serial No. 237,305, filed November 13, 1962.

Lacquers made from butyric esters of cellulose, sometimes containing resins and plasticizers, having been applied with excellent results to a wide variety of substrates such as plywood paneling, furniture, automobile bodies and structural aluminum. However, one drawback of such lacquers has been that they required solvent systems which were objectionable because of unpleasant odor, toxicity or explosion hazard. It would be highly advantageous if the solvent system could consist of predominant quantities of ethyl alcohol, which is nontoxic, does not have an unpleasant odor, and is relatively safe with regard to hazards of fire and explosion. However, the butyric acid esters of cellulose previously considered for use in lacquers have been insoluble in ethyl alcohol. Hence, lacquers comprising butyric esters of cellulose as a film former and ethyl alcohol as solvent have been unknown in the art.

One object of our invention is to provide lacquers containing butyric acid esters of cellulose as film former and substantial percentages of ethyl alcohol as solvent. Other objects of our invention will appear herein.

These and other objects of our invention are accomplished by a lacquer composed of a film-forming portion and a solvent portion, the film-forming portion essentially consisting of 75–100% of film former and 0–25% of plasticizer, at least 30% of the film former being a cellulose ester containing 42–52% butyryl, 0–5% fatty acid radicals having 2–3 carbon atoms, and 3–9% free hydroxyl, substantially the remainder of the film former being a resin compatible with the cellulose ester, or a cross-linking agent for the cellulose ester; and, the solvent portion essentially consisting of 75–100% ethyl alcohol, and 0–25% of a solvent compatible with ethyl alcohol and the polymeric material.

We have found that lacquers in accordance with our invention may be applied to a wide variety of substrates including wood, paper and metals, by any suitable technique, such as brushing or spraying. The lacquers in accordance with the invention do not possess an objectionable odor, are nontoxic and do not present serious fire or explosion hazards.

Our invention will be further illustrated by the following examples, which show clear wood finishing lacquers prepared with butyric esters of cellulose in ethyl alcohol solution.

Example 1

A lacquer was prepared by dispersing, at room temperature, 8.9 parts of cellulose butyrate containing 44.4% butyryl, 2.3% acetyl, 5.6% free hydroxyl and having an intrinsic viscosity of .59 in a 9:1 methylene chloride-methanol solution, and 13.3 parts of butylated urea-formaldehyde resin (60% concentration in a 60:40 butanol-xylene solution, commercially obtained as Uformite F–240) in 75.5 parts of anhydrous Tecsol (a proprietary ethyl alcohol), and adding 1.9 parts of dioctyl phthalate as plasticizer and .4 part of dibutylphosphate as a catalyst. The lacquer thus obtained was brush applied in several coats onto birch and fir plywoods and cured at room temperature. The cured coating was clear and glossy, adhered well and was resistant to water (both room temperature and boiling), whiskey and acetone.

Example 2

A lacquer was prepared by dispersing, at room temperature, 11.4 parts of cellulose butyrate containing 48% butyryl, 2.8% acetyl, 3.2% free hydroxyl and having an intrinsic viscosity of .64 in 9:1 methylene chloride-methanol solution, 17 parts of butylated urea-formaldehyde resin (60% concentration in a 60:40 butanol-xylene solution), 2.4 parts of dioctylphthalate, 1 part of dibutylphosphate, 54.6 parts anhydrous ethanol and 13.6 parts 2-methoxyethanol. This lacquer was brush applied onto birch and fir plywood and cured at room temperature. The coating obtained had similar properties to the coating obtained in Example 1.

Example 3

A lacquer was prepared as in Example 2 except that the solvent consisted of 51.2 parts anhydrous ethanol, 6.8 parts propanol and 10.2 parts 2-ethoxyethanol. The lacquer was sprayed onto birch and fir plywood at room temperature. The coating obtained had properties similar to the coating obtained in Example 1.

As noted previously, the solvent system of our invention essentially consists of 75–100% ethyl alcohol, the remainder being any solvent compatible with the ethyl alcohol, the cellulose ester, and any other polymeric material which might be employed in the coating. Among such compatible solvents are methyl alcohol, ether alcohols, esters, ketones, nitro alkanes and various spray and brush lacquer solvent mixtures used with cellulose acetate butyrate, such as the common mixture of 10–50% toluene or xylene and 50–90% of varying proportions of acetones, alcohols, esters and ether alcohols.

When it is desirable to apply the lacquers with a brush, very good results are obtained with a solvent system essentially consisting of about 80% anhydrous ethyl alcohol and about 20% 2-methoxyethanol. Spray lacquers may be formulated to produce good results with a solvent system essentially consisting of 75% anhydrous ethyl alcohol, 10% propanol and 15% 2-ethoxyethanol.

The film-forming portion of our invention may be solely a cellulose ester containing 42–52% butyryl, 0–5% fatty acid radicals having 2–3 carbon atoms and having 3–9% free hydroxyl. However, it may be advantageous in certain instances to incorporate various modifiers compatible with the cellulose ester and the solvent solution. Particularly good results may be obtained by incorporating cross-linking agents, such as alkylated urea or melamine formaldehyde resins, the alkyl groups of which contain 1 to 10 carbon atoms, hexamethoxymethyl melamine, an alkyl titanate, the alkyl groups of which contain 1 to 18 carbon atoms, an organic isocyanate, such as toluene-2,4-diisocyanate, or a polyisocyanate. Any resin may be incorporated in the film-forming portion so long as the resin is compatible with the cellulose esters employed in the invention. Such resins include oxidizing alkyd resins, oil soluble phenolic resins, polyvinyl acetate, polyvinyl acetal, polyvinyl butyl, polyvinyl chloride, polyvinyl chloride-acetate, toluene sulfonamide-formaldehyde resins, acrylic resins, liquid type epoxy resins, chlorinated diphenyl resins, rosin and its derivatives, and polydimethylsiloxane.

The film forming portion of the lacquers in accordance with our invention may contain up to 25%, based on the total quantity of film-forming ingredients, or any suitable plasticizer.

The cellulose esters of the present invention can be prepared in any of a number of ways that will become apparent to those skilled in the art when they learn the composition of such esters. The following represents one way in which they can be made:

CELLULOSE ESTER PROCESS

Into a conventional jacketed glass-lined reactor fitted with a fairly efficient stirrer are charged 16.8 pounds of cotton linters having a moisture content of 4.8% and 60 pounds of butyric acid. The resulting mixture is stirred to achieve uniformity and then digested for 1 hour at about 150° F. Then the mixture is centrifuged to remove excess acid. The filter cake is then blended with 60 pounds of fresh butyric acid and digested for ½ hour at about 150° F. The centrifugation blending and digestion step is then repeated. The resulting "dewatered" filter cake is then blended in the reactor with 64 pounds of butyric anhydride and cooled to 58° F. Into the resulting cooled esterification reactive mixture is stirred a blend consisting of 160 cc. butyric acid and 72 cc. of 98% $H_2SO_4$. During the next 2 hours the temperature of the esterification mass increases gradually to about 125° F. Then, the mass is cooled to about 110° F. and allowed to digest at this temperature for about 7 hours. To the resulting esterified mixture are then added (over about ½ hour) a blend consisting of 12 pounds of water and 36 pounds of acetic acid.

Twelve pounds of the resulting material are placed in a separate reactor and digested at about 135° F. for about 100 hours. Then, the catalyst is neutralized by adding to the hydrolyzed mixture a blend consisting of 250 cc. of water, 5 pounds acetic acid and 20 grams magnesium carbonate, and then stirring the resulting mixture for an additional 16 hours at about 130° F. Then an additional 16 pounds of acetic acid are blended into the mass, which mass is then precipitated by blending it slowly into distilled water. The precipitated product is washed twelve times with distilled water and finally rinsed with a dilute solution of disodium orthophosphate and dried. This is the product used in Example 2 above.

It is to be understood that the lacquer compositions as described above and as defined in the appended claims may have customary modifiers and addenda incorporated therein, including pigments, dyes, ultraviolet absorbers, antioxidants, fungicides and catalysts to promote cross-linking between the cellulose ester and cross-linking agents, when such are incorporated in the lacquer.

This invention has been described in detail with particular reference to preferred embodiments thereof, but it will be understood that variations and modifications can be effected within the spirit and scope of the invention as described hereinabove and as defined in the appended claims.

We claim:
1. A lacquer composition comprising a film-forming portion and a solvent portion, the film-forming portion essentially consisting of 75–100% film former and 0–25% plasticizer, at least 30% of the film-forming portion being a cellulose ester containing 42–52% butyryl, 0–5% fatty acid radicals of 2–3 carbon atoms and 3–9% free hydroxyl, and substantially the remainder of the film former, if any, being selected from the group consisting of resins compatible with the cellulose ester and the solvent or a cross-linking agent for the cellulose ester, and the solvent portion essentially consisting of 75–100% ethyl alcohol and 25–0% of a solvent compatible with the ethyl alcohol and film former.

2. A lacquer composition composed of a film-forming portion and a solvent portion, the film-forming portion essentially consisting of 75–100% film former and 0–25% plasticizer, at least 30% of the film-forming portion being a cellulose ester containing 42–52% butyryl, 0–5% fatty acid radicals of 2–3 carbon atoms and 3–9% free hydroxyl, and substantially the remainder of the film former being a cross-linking agent for the cellulose ester selected from the group consisting of alkylated urea-formaldehyde resin wherein the alkyl group contains 1–10 carbon atoms, alkylated melamine-formaldehyde resin wherein the alkyl group contains 1–10 carbon atoms, hexamethoxymethyl melamine, an alkyl titanate, the alkyl groups of which contain 1–18 carbon atoms, an organic isocyanate and organic polyisocyanates, and the solvent portion essentially consisting of 75–100% ethyl alcohol and 25–0% of a solvent compatible with the ethyl alcohol and film former.

3. A lacquer composed of a film-forming portion and a solvent portion, the film-forming portion essentially consisting of about 48% cellulose ester containing 48% butyryl, 2.3% acetyl, and 5.6% free hydroxyl, about 42% butylated-urea formaldehyde resin and about 10% plasticizer; and the solvent portion essentially consisting of anhydrous ethyl alcohol.

4. A cellulose ester soluble in at least 95% anhydrous ethyl alcohol, said cellulose ester containing 42–52% butyryl, less than 5% fatty acid radicals having 2–3 carbon atoms, and 3–9% free hydroxyl.

5. A cellulose ester soluble in at least 95% anhydrous ethyl alcohol, said cellulose ester containing 42–52% butyryl, less than 5% acetyl, and 3–9% free hydroxyl.

6. A low viscosity cellulose ester soluble in at least 95% anhydrous ethyl alcohol, said cellulose ester having approximately 48% butyryl, 2.8% acetyl and 3% free hydroxyl.

References Cited
UNITED STATES PATENTS

| | | | |
|---|---|---|---|
| 2,687,385 | 8/1954 | Olson | 260—15 |
| 2,816,106 | 12/1957 | Malm et al. | 260—230 |
| 2,875,164 | 2/1959 | Ball et al. | 260—215 |

OTHER REFERENCES

Ott et al., Cellulose and Cellulose Derivatives, 2nd ed., part II, pages 797–803, Interscience Publishers Inc., 1954 (Copy in Scientific Library).

WILLIAM H. SHORT, *Primary Examiner.*

E. M. WOODBERRY, *Examiner.*